United States Patent
Ruth et al.

(10) Patent No.: US 12,480,438 B2
(45) Date of Patent: Nov. 25, 2025

(54) INTERNAL COMBUSTION ENGINE INCLUDING THROUGH-BOLT APERTURE AND SINGLE THROUGH-BOLT

(71) Applicant: CUMMINS INC., Columbus, IN (US)

(72) Inventors: Michael J. Ruth, Franklin, IN (US);
Adam C. Cecil, Columbus, IN (US);
David M. Barnes, Columbus, IN (US);
Jason W. Mackey, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/849,736

(22) PCT Filed: Mar. 21, 2023

(86) PCT No.: PCT/US2023/015784
§ 371 (c)(1),
(2) Date: Sep. 23, 2024

(87) PCT Pub. No.: WO2023/183309
PCT Pub. Date: Sep. 28, 2023

(65) Prior Publication Data
US 2025/0314197 A1    Oct. 9, 2025

Related U.S. Application Data

(60) Provisional application No. 63/323,375, filed on Mar. 24, 2022.

(51) Int. Cl.
*F02B 75/24* (2006.01)
*F02F 7/00* (2006.01)

(52) U.S. Cl.
CPC .......... *F02B 75/243* (2013.01); *F02F 7/0009* (2013.01)

(58) Field of Classification Search
CPC ...... F02B 75/24; F02B 75/243; F02B 75/246; F02F 7/0085; F02F 7/006; F02F 7/0046;
(Continued)

(56) References Cited

U.S. PATENT DOCUMENTS

| 2,809,614 A | 10/1957 | Prescott et al. |
| 3,046,952 A * | 7/1962 | Dolza .................. F02F 7/0007 384/294 |

(Continued)

FOREIGN PATENT DOCUMENTS

| CN | 114233506 | 3/2022 | |
| DE | 202012000275 U1 * | 2/2012 | ............ F02B 75/282 |

(Continued)

OTHER PUBLICATIONS

International Search Report and Written Opinion for PCT Application No. PCT/US2023/015784, dated Jun. 22, 2023.

(Continued)

*Primary Examiner* — Grant Moubry
(74) *Attorney, Agent, or Firm* — Foley & Lardner LLP (57) ABSTRACT

An internal combustion engine includes a first cylinder block, a first head, a first overhead structure, a second cylinder block, a second head, a second overhead structure, a first through-bolt aperture, and a first through-bolt. The first head is in contact with the first cylinder block. The first overhead structure is in contact with the first head opposite the first cylinder block. The second cylinder block is in contact with the first cylinder block opposite the first head. The second head is in contact with the second cylinder block opposite the first cylinder block. The second overhead structure is in contact with the second head opposite the second cylinder block. The first through-bolt aperture is defined through the first overhead structure, the first head, (Continued)

the first cylinder block, the second cylinder block, the second head, and the second overhead structure.

20 Claims, 3 Drawing Sheets

(58) Field of Classification Search
CPC ...... F02F 7/0009; F02F 7/0002; F02F 7/0021; F02F 2007/0041; F02F 2007/0063
See application file for complete search history.

(56) References Cited

U.S. PATENT DOCUMENTS

| | | | |
|---|---|---|---|
| 4,530,323 A * | 7/1985 | Wakasa | F02F 1/40 |
| | | | 123/193.5 |
| 4,567,859 A * | 2/1986 | Taguchi | F02F 1/40 |
| | | | 123/193.5 |
| 5,560,327 A | 10/1996 | Brackett | |
| 5,769,046 A | 6/1998 | Ransone | |
| 5,933,950 A | 8/1999 | Yuo et al. | |
| 6,279,519 B1 | 8/2001 | Nagel et al. | |
| 6,283,081 B1 * | 9/2001 | Ozeki | F02F 1/108 |
| | | | 123/193.2 |
| 6,735,863 B1 | 5/2004 | Hayman | |
| 7,150,255 B2 | 12/2006 | Uruno et al. | |
| 7,293,756 B2 | 11/2007 | Utsumi et al. | |
| 7,520,256 B2 | 4/2009 | Omura et al. | |
| 9,739,186 B2 * | 8/2017 | Barnes | F01M 11/02 |
| 9,810,177 B2 * | 11/2017 | Barnes | F02F 7/0095 |
| 11,067,029 B2 | 7/2021 | Barnes et al. | |
| 11,118,534 B2 | 9/2021 | Ichikawa et al. | |
| 11,248,558 B2 | 2/2022 | Ichikawa et al. | |
| 2004/0206328 A1 | 10/2004 | Gunji et al. | |
| 2005/0115524 A1 | 6/2005 | Sanada et al. | |
| 2019/0093478 A1 * | 3/2019 | Frasinel | F02F 1/004 |
| 2021/0215119 A1 | 7/2021 | Ichikawa et al. | |

FOREIGN PATENT DOCUMENTS

| | | | | |
|---|---|---|---|---|
| DE | 102016113682 A1 * | 1/2018 | | F02F 7/0053 |
| DE | 10 2016 116 814 | 3/2018 | | |
| WO | WO-2020149819 A1 * | 7/2020 | | F02F 1/40 |

OTHER PUBLICATIONS

International Search Report and Written Opinion for PCT Application No. PCT/US2023/035853, dated Feb. 15, 2024.

* cited by examiner

INTERNAL COMBUSTION ENGINE INCLUDING THROUGH-BOLT APERTURE AND SINGLE THROUGH-BOLT

CROSS-REFERENCE TO RELATED PATENT APPLICATION

The present application is the U.S. national phase of PCT Application No. PCT/US2023/015784, filed Mar. 21, 2023, which claims priority to and the benefit of U.S. Provisional Patent Application No. 63/323,375, filed Mar. 24, 2022, the contents of which are incorporated herein by reference.

TECHNICAL FIELD

The present disclosure relates generally to through-bolts for use in internal combustion engines.

BACKGROUND

For an internal combustion engine, it may be desirable to reduce the weight of the internal combustion engine. One approach that can be implemented to reduce the weight of the internal combustion engine is to manufacture some of the engine components from lower weight materials. However, reducing the weight of engine components can lead to tradeoffs in the efficiency of the internal combustion engine.

SUMMARY

In various embodiments, an internal combustion engine includes a first cylinder block, a first head, a first overhead structure, a second cylinder block, a second head, a second overhead structure, a first through-bolt aperture, and a first through-bolt. The first head is in contact with the first cylinder block. The first overhead structure is in contact with the first head opposite the first cylinder block. The second cylinder block is in contact with the first cylinder block opposite the first head. The second head is in contact with the second cylinder block opposite the first cylinder block. The second overhead structure is in contact with the second head opposite the second cylinder block. The first through-bolt aperture is defined through the first overhead structure, the first head, the first cylinder block, the second cylinder block, the second head, and the second overhead structure. The first through-bolt extends through the first through-bolt aperture and couples the first overhead structure, the first head, the first cylinder block, the second cylinder block, the second head, and the second overhead structure.

In various embodiments, an internal combustion engine includes a first cylinder block, a first head, a first overhead structure, a second cylinder block, a second head, a first through-bolt aperture, a first through-bolt, a second through-bolt aperture, and a second through-bolt. The first head is in contact with the first cylinder block. The first overhead structure is in contact with the first head opposite the first cylinder block. The second cylinder block is in contact with the first cylinder block opposite the first head. The second head is in contact with the second cylinder block opposite the first cylinder block. The first through-bolt aperture is defined through the first overhead structure, the first head, the first cylinder block, the second cylinder block, and the second head. The first through-bolt extends through the first through-bolt aperture and coupling the first overhead structure, the first head, the first cylinder block, the second cylinder block, and the second head. The second through-bolt aperture is defined through the first overhead structure, the first head, the first cylinder block, the second cylinder block, and the second head. The second through-bolt extends through the second through-bolt aperture and couples the first overhead structure, the first head, the first cylinder block, the second cylinder block, and the second head.

This summary is illustrative only and is not intended to be in any way limiting.

BRIEF DESCRIPTION OF THE DRAWINGS

The disclosure will become more fully understood from the following detailed description, taken in conjunction with the accompanying figures, wherein like reference numerals refer to like elements, in which.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Implementations herein relate to an internal combustion engine that includes a single through-bolt in a through-bolt aperture (i.e., one through-bolt for the through-bolt aperture as opposed to multiple through-bolts for the through-bolt aperture) passing through multiple engine components from a first end of the internal combustion engine to a second end of the internal combustion engine. When tightened, the through-bolt is configured to hold the engine components in compression, so that the engine components of the internal combustion engine may be made of lower weight and/or lower strength materials while still being capable of withstanding the forces that are associated with high efficiency internal combustion engines. In this way, the boxer-style internal combustion engine with the through-bolt may provide the benefit of a lower weight internal combustion engine while still being capable of high efficiency. The internal combustion engine may include multiple pairs of through-bolts and through-bolt apertures, with each through-bolt aperture being associated with a single through-bolt.

Figure 1:
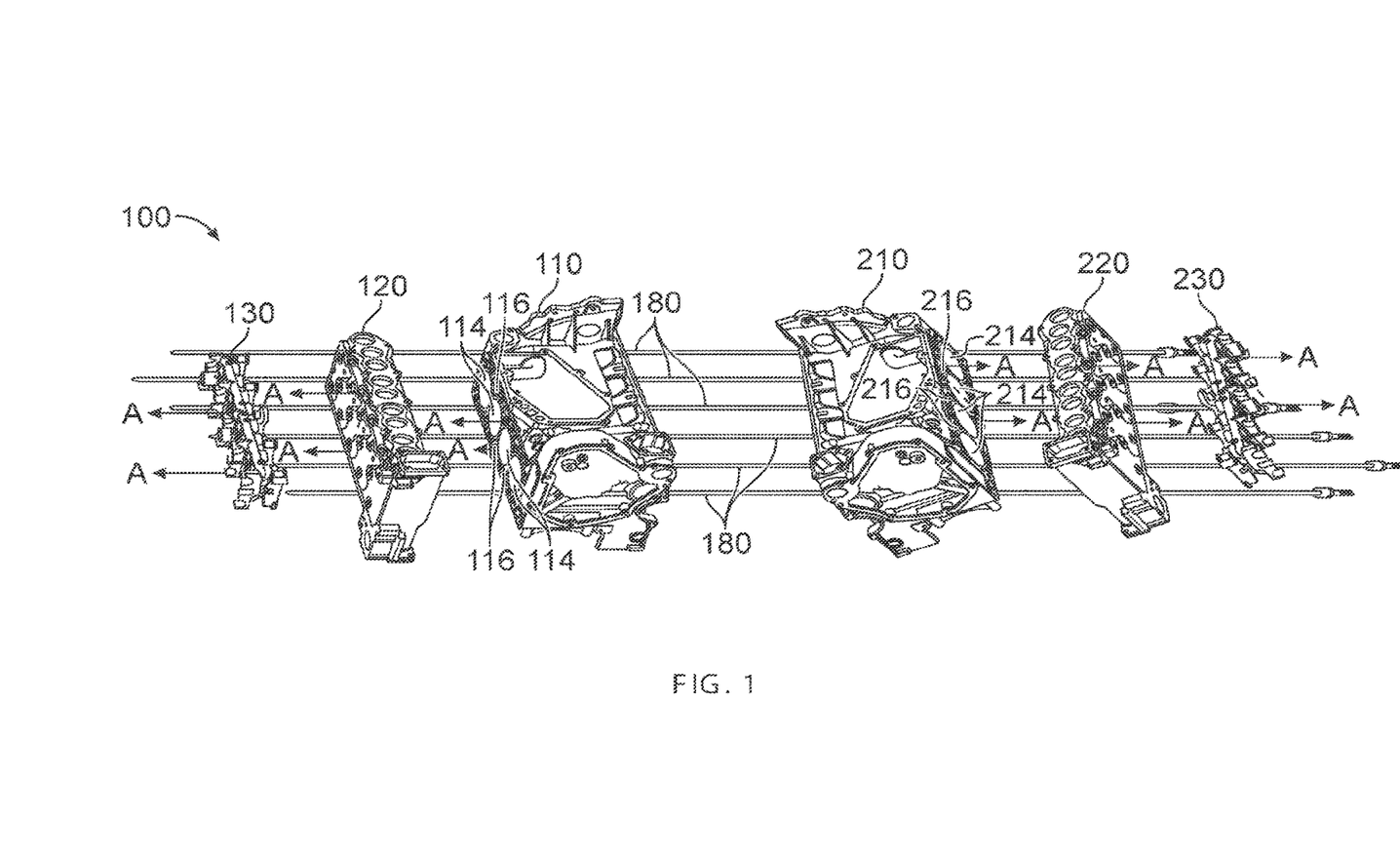
FIG. 1 is an exploded view of an internal combustion engine according to one embodiment.

FIG. 1 depicts an exploded view of an internal combustion engine 100, according to an exemplary embodiment.

Figure 2:
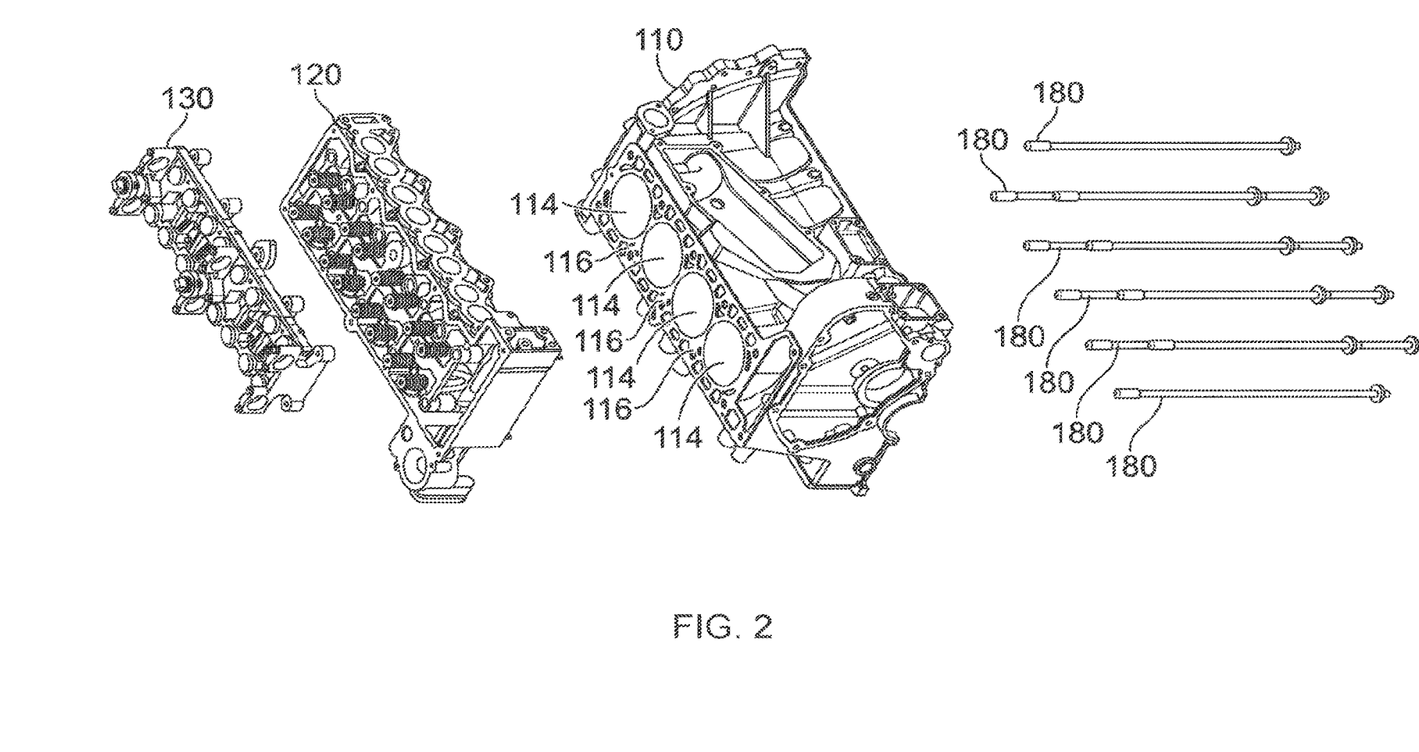
FIG. 2 is an exploded view of a portion of the internal combustion engine of FIG. 1.
Figure 3:
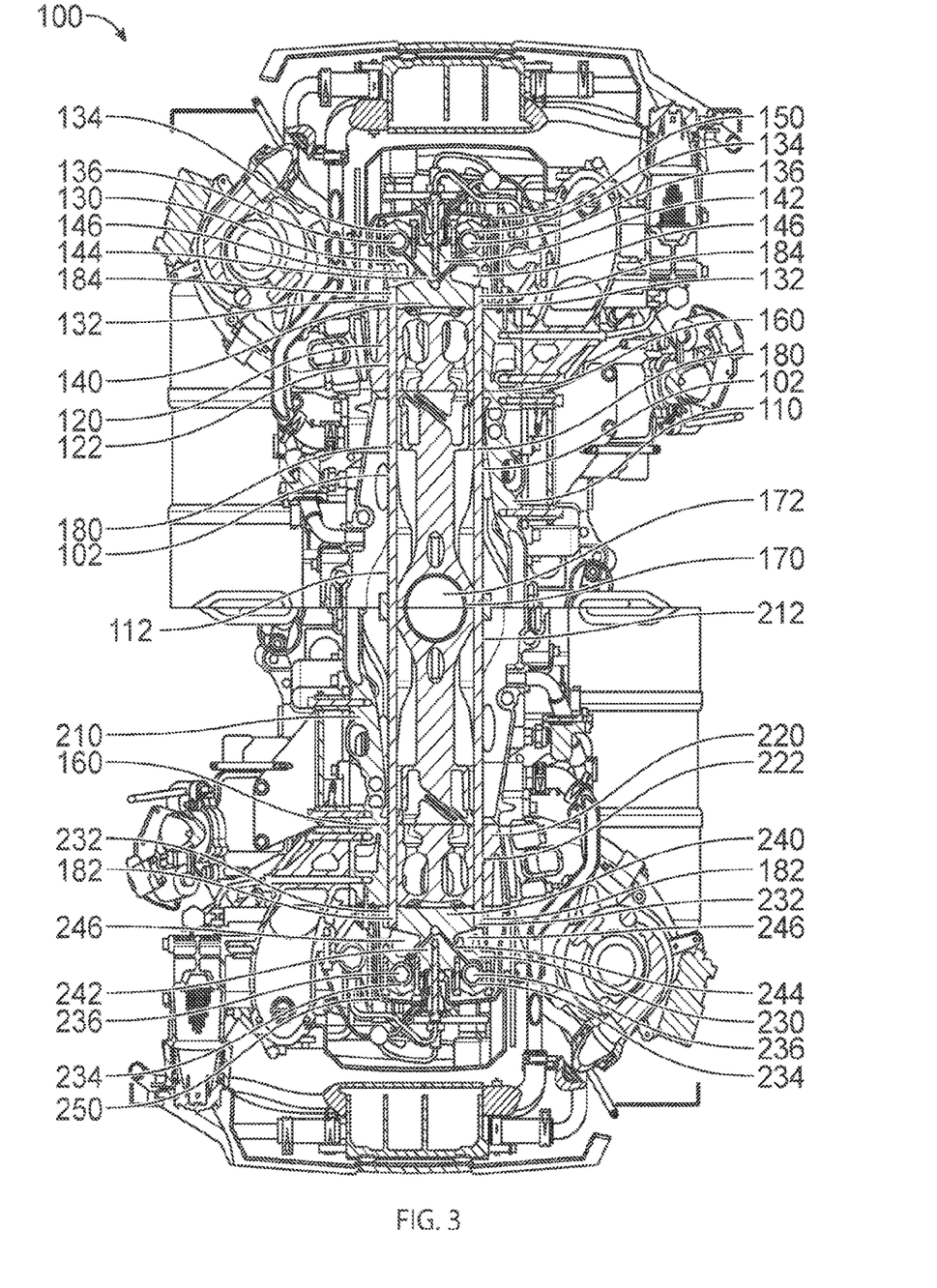
FIG. 3 is a cross-sectional view of the internal combustion engine of FIG. 1 taken along the plane A-A in FIG. 1.

The internal combustion engine 100 may be on a passenger vehicle (e.g., sedan, van, pick-up truck), a commercial vehicle (e.g., semi-trailer truck), or on another system that employs an internal combustion engine. The internal combustion engine may be, for example, a diesel-powered internal combustion engine or a spark-ignition internal combustion engine powered by gasoline, ethanol, or other fuel. FIG. 2 depicts an exploded view of a portion of the internal combustion engine 100 of FIG. 1. FIG. 3 depicts a cross-sectional view of the internal combustion engine 100 of FIG. 1 taken along the plane A-A in FIG. 1.

Referring to FIG. 1, the internal combustion engine 100 includes a first cylinder block 110 (e.g., engine component, cylinder block, etc.), a first head 120 (e.g., engine component, cylinder head), a first overhead structure 130 (e.g., engine component, cam carrier), a second cylinder block 210 (e.g., engine component, engine block, block), a second head 220 (e.g., engine component, cylinder head), a second overhead structure 230 (e.g., engine component, cam carrier), a first through-bolt aperture 102, and a first through-bolt 180 (e.g., tie-rod). The first head 120 is in contact with the first cylinder block 110. The first overhead structure 130 is in contact with the first head 120 opposite the first cylinder block 110. The second cylinder block 210 is in contact with the first cylinder block 110 opposite the first head 120. The second head 220 is in contact with the second cylinder block 210 opposite the first cylinder block 110. The second overhead structure 230 is in contact with the second head 220 opposite the second cylinder block 210. The first through-bolt aperture 102 is defined through the first overhead structure 130, the first head 120, the first cylinder block 110, the second cylinder block 210, the second head 220, and the second overhead structure 230. The first through-bolt 180 extends through the first through-bolt aperture 102 and coupling the first overhead structure 130, the first head 120, the first cylinder block 110, the second cylinder block 210, the second head 220, and the second overhead structure 230.

The first cylinder block 110 includes a plurality of cylinders 114 (e.g., a first cylinder 114, a second cylinder 114, etc.) positioned throughout the first cylinder block 110. The first cylinder block 110 has cast-in liners for the cylinders 114. These liners may be made from iron, for example. Each of the cylinders 114 is configured to facilitate movement of a piston.

As shown in FIGS. 1-2, the first cylinder block 110 includes four cylinders 114. However, in other embodiments, the first cylinder block 110 includes one, two, three, five, six, or more cylinders 114. As shown in FIGS. 1-2, the cylinders 114 are positioned in a single row in the first cylinder block 110. In other embodiments, the cylinders 114 are positioned in multiple rows in the first cylinder block 110. The first cylinder 114 may be centered on a first axis and the first through-bolt aperture 102 may be centered on a second axis that is parallel to the first axis.

The first cylinder block 110 includes a plurality of first bulkheads 116 that are portions of the first cylinder block 110 positioned between adjacent ones of the cylinders 114. In other words, each of the first bulkheads 116 extends between two adjacent ones of the cylinders 114. In this way, the first bulkheads 116 are partitions of the first cylinder block 110 that divide or separate the cylinders 114 of the first cylinder block 110 from each other.

The first cylinder block 110 may be made of a material having a lower strength (e.g., lower yield strength) and/or lower weight (e.g., lower specific weight) than a material of another engine component of the internal combustion engine 100. In some embodiments, the material of the first cylinder block 110 is aluminum or includes aluminum (e.g., the first cylinder block 110 is made from aluminum). Use of aluminum for the first cylinder block 110 decreases a total weight of the internal combustion engine 100 compared to when higher weight materials are used for the first cylinder block 110. The first cylinder block 110 may be manufactured by machining, casting, additive manufacturing (e.g., 3D printing, etc.), or other manufacturing techniques. The use of lower strength and/or lower weight materials, such as aluminum, beneficially simplifies machining because these materials may be machined more quickly and may be machined by smaller equipment. In this way, the first cylinder block 110 may be advantageous compared to other cylinder blocks which are not made of lighter or lower strength materials.

In various embodiments, the internal combustion engine 100 includes the first cylinder block 110, the first head 120, the first overhead structure 130, the second cylinder block 210, the second head 220, the first through-bolt aperture 102, the first through-bolt 180, the second through-bolt aperture 102, and the second through-bolt 180. The first head 120 is in contact with the first cylinder block 110. The first overhead structure 130 is in contact with the first head 120 opposite the first cylinder block 110. The second cylinder block 210 is in contact with the first cylinder block 110 opposite the first head 120. The second head 220 is in contact with the second cylinder block 210 opposite the first cylinder block 110. The first through-bolt aperture 102 is defined through the first overhead structure 130, the first head 120, the first cylinder block 110, the second cylinder block 210, and the second head 220. The first through-bolt 180 extends through the first through-bolt aperture 102 and couples the first overhead structure 130, the first head 120, the first cylinder block 110, the second cylinder block 210, and the second head 220. The second through-bolt aperture 102 is defined through the first overhead structure 130, the first head 120, the first cylinder block 110, the second cylinder block 210, and the second head 220. The second through-bolt 180 extends through the second through-bolt aperture 102 and couples the first overhead structure 130, the first head 120, the first cylinder block 110, the second cylinder block 210, and the second head 220.

As is explained in more detail herein, the first head 120 is coupled (e.g., connected, mounted) to the first cylinder block 110. Thus, the first head 120 is in contact with (e.g., interfaces with, etc.) the first cylinder block 110. The first head 120 is configured to provide combustion chambers, each of which aligns with one of the cylinders 114 of the first cylinder block 110.

The first head 120 may be made of a material having a lower strength and/or lower weight than a material of another engine component of the internal combustion engine 100. In some embodiments, the material of the first head 120 is aluminum or includes aluminum (e.g., the first head 120 is made from aluminum). Similarly to the first cylinder block 110, use of aluminum for the first head 120 decreases the total weight of the internal combustion engine 100 compared to when higher weight materials are used for the first head 120. The first head 120 may be manufactured by machining, casting, additive manufacturing, or other manufacturing techniques.

The first overhead structure 130 is coupled to the first head 120 such that the first head 120 is positioned between the first cylinder block 110 and the first overhead structure 130. Thus, the first overhead structure 130 is in contact with the first head 120 opposite (e.g., the contact occurs on opposite sides of the first head 120) the first cylinder block 110. In some embodiments, the first overhead structure 130 is removably coupled to the first head 120. As is explained in more detail herein, the coupling of the first overhead structure 130 to the first head 120, and therefore to the first cylinder block 110, utilizes compression provided by a plurality of the through-bolts 180 (discussed in further detail herein).

Unlike the first cylinder block 110 and the first head 120, the first overhead structure 130 may be made of a material having a higher strength (e.g., higher yield strength) and/or higher weight (e.g., higher specific weight) than a material of another engine component (e.g., the first cylinder block 110, the first head 120) of the internal combustion engine 100. In some embodiments, the material of the first overhead structure 130 is iron or includes iron (e.g., the first overhead structure 130 is made from iron). For example, the material of the first overhead structure 130 may include steel. The material of the first overhead structure 130 may be selected so as to provide desirable support for a load of the through-bolts 180 (discussed in further detail herein). The first overhead structure 130 may be manufactured by machining, casting, additive manufacturing, or other manufacturing techniques. Additionally, the first overhead structure 130 may be manufactured using composite construction methods to facilitate use at elevated cylinder pressures while also providing weight savings compared to overhead structures of other internal combustion engines. The first overhead structure 130 may have a one-piece monolithic construction. The first head 120 may be made from aluminum. The first overhead structure 130 may made from a material that is not aluminum.

The first overhead structure 130 includes a first cam shaft aperture 134 (e.g., hole, opening). The first cam shaft aperture 134 is configured to receive and retain a first cam shaft 136 (e.g., a cam journal). The first cam shaft 136 may be an intake cam shaft or an exhaust cam shaft. As shown in FIG. 3, the first overhead structure 130 includes two of the first cam shaft apertures 134, one of which is configured to receive a first cam shaft 136 that is an intake cam shaft, and the second of which is configured to receive a first cam shaft 136 that is an exhaust cam shaft.

In some embodiments and as shown in FIG. 3, the first overhead structure 130 includes a first base portion 140, a first support portion 142, and a first neck portion 144. The first base portion 140 is coupled via the first neck portion 144 to the first support portion 142. The first support portion 142 includes the first cam shaft aperture 134. The first support portion 142 is configured to support the first cam shaft 136.

The first neck portion 144 couples the first support portion 142 to the first base portion 140. The first neck portion 144 is configured to create a first physical gap 146 between the first base portion 140 of the first overhead structure 130 and the first support portion 142 of the first overhead structure 130, maintaining the first base portion 140 spaced apart from the first support portion 142.

In FIG. 3, the first overhead structure 130 includes two first physical gaps 146 between the first base portion 140 and the first support portion 142. The first neck portion 144 has a substantially bar-shaped or beam-shaped cross-section. For example, the first neck portion 144 may be shaped so as to have a cross-section that includes a vertical rectangular portion, a first horizontal rectangular portion at a first end of the vertical rectangular portion, and a second horizontal rectangular portion at a second end of the vertical rectangular portion. When the first overhead structure 130 is pulled against the first head 120, the first base portion 140 is configured to be pulled (e.g., deflected) without correspondingly pulling the first support portion 142. In this way, alignment between the first cam shafts 136 and the first support portion 142 is maintained even when the first overhead structure 130 is pulled against the first head 120.

The internal combustion engine 100 also includes a first cover 150 is positioned over the first overhead structure 130. The first cover 150 is coupled to the first head 120.

The second cylinder block 210 is coupled to the first cylinder block 110. Thus, the second cylinder block 210 is in contact with the first cylinder block 110 opposite (e.g., the contact occurs on opposite sides of the first cylinder block 110) the first head 120. The second cylinder block 210 may be configured in the same way as the first cylinder block 110. In other embodiments, however, the second cylinder block 210 is configured differently than the first cylinder block 110.

The second cylinder block 210 includes a plurality of cylinders 214 (e.g., a first cylinder 214, a second cylinder 214, etc.) that may be configured in the same way as the cylinders 114 of the first cylinder block 110. In other embodiments, however, the second cylinders 214 of the second cylinder block 210 are configured differently than the cylinders 114 of the first cylinder block 110. In various embodiments, each of the cylinders 214 of the second cylinder block 210 is aligned with one of the cylinders 114 of the first cylinder block 110.

The first cylinder block may include a first cylinder 114 and a second cylinder 114. The second cylinder block 210 may include a third cylinder 214 and a fourth cylinder 214. The first cylinder block 110 and the second cylinder block 210 may be configured such that the first cylinder 114 is aligned with the third cylinder 214. The first cylinder block 110 and the second cylinder block 210 are configured such that the second cylinder 114 is aligned with the fourth cylinder 214. The first cylinder block 110, the second cylinder block 210, the first through-bolt aperture 102, and the second through-bolt aperture 102 may be configured such that the first plane extends between the first cylinder 114 and the second cylinder 114 and between the third cylinder 214 and the fourth cylinder 214.

The second cylinder block 210 includes a plurality of second bulkheads 216 that may be configured in the same way as the first bulkheads 116. In other embodiments, however, the second bulkheads 216 may be configured differently than the first bulkheads 116.

The connection between the second cylinder block 210 and the first cylinder block 110 defines a crankshaft bore 170. The crankshaft bore 170 is configured to receive a main journal of a crankshaft 172 of the internal combustion engine 100. The crankshaft bore 170 is configured to facilitate rotation of the crankshaft 172 relative to the first cylinder block 110 and the second cylinder block 210.

In some embodiments, the second cylinder block 210 is made from the same material as the first cylinder block 110. In other embodiments, the first cylinder block 110 and the second cylinder block 210 are made from different materials.

The second head 220 is coupled to the second cylinder block 210. Thus, the second head 220 is in contact with the second cylinder block 210 opposite (e.g., the contact occurs on opposite sides of the second cylinder block 210) the first cylinder block 110. The second head 220 may be configured in the same way as the first head 120. In other embodiments, however, the second head 220 is configured differently than the first head 120.

In some embodiments, the first head 120 and the second head 220 are made from the same material. In other embodiments, the first head 120 and the second head 220 are made from different materials. In some embodiments, the first cylinder block 110, the second cylinder block 210, the first head 120, and the second head 220 are all made from the same material. In other embodiments, the first cylinder block 110 and the second cylinder block 210 are made from a material that is different from a material from which the first head 120 and the second head 220 are made. In some embodiments, the first head 120 is made from aluminum, the second head 220 is made from aluminum, the first overhead structure 130 is not made from aluminum, and the second overhead structure 230 is not made from aluminum.

The second overhead structure 230 is coupled to the second head 220 such that the second head 220 is positioned between the second cylinder block 210 and the second overhead structure 230. Thus, the second overhead structure 230 is in contact with the second head 220 opposite (e.g., the contact occurs on opposite sides of the second head 220) the second cylinder block 210. The second overhead structure 230 may be configured in the same way as the first overhead structure 130. In other embodiments, however, the second overhead structure 230 is configured differently than the first overhead structure 130.

The second overhead structure 230 includes a second cam shaft aperture 234 (e.g., hole, opening) that may be configured in the same way as the first cam shaft aperture 134. In other embodiments, however, the second cam shaft aperture 234 is configured differently than the first cam shaft aperture 134. The second cam shaft aperture 234 is configured to receive and retain a second cam shaft 236 (e.g., a cam journal). The second cam shaft 236 may be configured in the same way as the first cam shaft 136. In other embodiments, however, the second cam shaft 236 is configured differently than the first cam shaft 136. In some embodiments, both the first cam shaft aperture 134 is configured to receive and retain a first cam shaft 136 and the second cam shaft aperture 234 is configured to receive and retain a second cam shaft 236. In some embodiments, at least one of the first overhead structure 130 or the second overhead structure 230 includes a cam shaft aperture 134/234 configured to receive and retain a cam shaft 136/236.

As shown in FIG. 3, the second overhead structure 230 includes a second base portion 240 that may be configured in the same way as the first base portion 140. In other embodiments, however, the second base portion 240 is configured differently than the first base portion 140. The second overhead structure 230 includes a second support portion 242 that may be configured in the same way as the first support portion 142. In other embodiments, however, the second support portion 242 is configured differently than the first support portion 142. The second overhead structure 230 includes a second neck portion 244 that may be configured in the same way as the first neck portion 144. In other embodiments, however, the second neck portion 244 is configured differently than the first neck portion 144. The second neck portion 244 is configured to create a second physical gap 246 that may be configured in the same way as the first physical gap 146. In other embodiments, however, the second physical gap 246 is configured differently than the first physical gap 146. In some embodiments, the first overhead structure 130 includes a first base portion 140, a first support portion 142, and a first neck portion 144, and the second overhead structure 230 also includes a second base portion 240, a second support portion 242, and a second neck portion 244.

The internal combustion engine 100 also includes a second cover 250. The second cover 250 is positioned over the second overhead structure 230. The second cover 250 is coupled to the second head 220.

In some embodiments, a relatively thin sealing gasket 160 is positioned between at least one of the first overhead structure 130, the first head 120, the first cylinder block 110, the second cylinder block 210, the second head 220, or the second overhead structure 230. When the relatively thin sealing gasket 160 is present between two components, the two components are still considered coupled to each other. For example, as shown in FIG. 3, the first cylinder block 110 is still considered coupled to the first head 120 when the relatively thin sealing gasket 160 is positioned between the first cylinder block 110 and the first head 120.

As shown in FIG. 3, the first head 120, the first cylinder block 110, the second cylinder block 210, and the second head 220 are all positioned between the first overhead structure 130 and the second overhead structure 230. In this arrangement, the engine components made from lower weight and/or lower strength materials (e.g., the first head 120, first cylinder block 110, second cylinder block 210, and second head 220) are effectively positioned between the engine components made from higher weight and/or higher strength materials (e.g., the first overhead structure 130 and the second overhead structure 230). This arrangement is capable of withstanding a relatively large load, such as 3,000 pounds per square inch for a peak cylinder pressure capability of the internal combustion engine 100.

In some embodiments, the first through-bolt aperture 102 and the second through-bolt aperture 102 are aligned on a first plane. In other words, the first plane extends through a center of the first through-bolt aperture 102 and a center of the second through-bolt aperture 102. The second through-bolt aperture 102 and the third through-bolt aperture 102 are also aligned on a second plane. In other words, the second plane extends through a center of the second through-bolt aperture 102 and a center of the third through-bolt aperture 102. In various embodiments, the second plane is orthogonal to the first plane. In various embodiments, the first through-bolt aperture 102 and the third through-bolt aperture 102 are aligned on a third plane. In other words, the third plane extends through a center of the first through-bolt aperture 102 and a center of the third through-bolt aperture 102. The third plane extends through one of the cylinders 114 of the first cylinder block 110 (e.g., the third plane extends across one of the cylinders 114 of the first cylinder block 110) and one of the cylinders 214 of the second cylinder block 210 (e.g., the third plane extends across one of the cylinders 214 of the second cylinder block 210). Such an arrangement of the through-bolt apertures 102, the first plane, the second plane, and the third plane is shown in FIG. 3, for example.

The through-bolt aperture 102 is defined through the first overhead structure 130, the first head 120, the first cylinder block 110, the second cylinder block 210, the second head 220, and the second overhead structure 230. As shown in FIG. 3, the internal combustion engine 100 has two of the through-bolt apertures 102 that are aligned across the internal combustion engine 100. In other embodiments, the internal combustion engine 100 has one through-bolt aperture 102 in a cross-section of the internal combustion engine 100 rather than two of the through-bolt apertures 102 that are aligned across the internal combustion engine 100. In some embodiments, the internal combustion engine 100 has two of the through-bolt apertures 102 for each of the cylinders 114 of the first cylinder block 110. In other embodiments, the internal combustion engine 100 has two of the through-bolt apertures 102 for each of the cylinders 114 of the first cylinder block 110 and two more of the through-bolt apertures 102, such that two of the through-bolt apertures 102 are positioned in each of the first bulkheads 116 and two of the through-bolt apertures 102 are positioned at each end of the internal combustion engine 100. In still other embodiments, the internal combustion engine 100 has one, two, three, four, five, six, or more of the through-bolt apertures 102 positioned throughout the internal combustion engine 100. In some embodiments, at least one of: a portion of the first through-bolt aperture 102 in the first overhead structure 130 is threaded and threadably engaged with corresponding threads on the first through-bolt 180; or a portion of the first through-bolt aperture 102 in the second overhead structure 230 is threaded and threadably engaged with corresponding threads on the first through-bolt 180.

Each of the through-bolts 180 is positioned in the one of through-bolt apertures 102. In some embodiments, the through-bolt 180 is an M12 bolt. Tightening the through-bolt 180 pulls the first overhead structure 130 and the second overhead structure 230 against the first head 120, the first cylinder block 110, the second cylinder block 210, and the second head 220, and compresses these engine components. The through-bolt 180 facilitates assembly of the internal combustion engine 100 by extending through the engine components and holding the engine components together, thereby acting as a guide for assembly of the engine components.

The through-bolt aperture 102 includes a first portion 112 that is defined through the first cylinder block 110. The first portion 112 may be positioned in a first bulkhead 116 of the first cylinder block 110. The first portion 112 is configured to allow the through-bolt 180 to extend through the first cylinder block 110. When the through-bolt 180 is tightened, the first cylinder block 110 is maintained in compression.

The through-bolt aperture 102 also includes a second portion 122 that is defined through the first head 120. The second portion 122 is configured to allow the through-bolt 180 to extend through the first head 120. The second portion 122 is contiguous with the first portion 112. When the through-bolt 180 is tightened, the first head 120 is maintained in compression.

The through-bolt aperture 102 also includes a third portion 132 that is defined through the first overhead structure 130. The third portion 132 is configured to allow the through-bolt 180 to extend through the first overhead structure 130. The third portion 132 is contiguous with the second portion 122. In some embodiments, the third portion 132 is positioned in the first base portion 140. The third portion 132 may be threaded and may be configured to engage corresponding threads on the through-bolt 180. Thus, a portion (e.g., the third portion 132) of the through-bolt aperture 102 is threaded and threadably engaged with corresponding threads of the through-bolt 180.

Each of the through-bolts 180 includes a shank 182 and a head 184. In some embodiments, the third portion 132 is configured to receive the head 184. As shown in FIG. 3, when the head 184 is positioned in the first overhead structure 130, the through-bolt 180 is tightened via access to the first overhead structure 130. The head 184 may be tightened via a nut, hex drive, or other method of torqueing. In other embodiments, the third portion 132 is configured to receive the shank 182.

The through-bolt aperture 102 also includes a fourth portion 212 that is defined through the second cylinder block 210 and may be configured in the same way as the first portion 112. In other embodiments, however, the fourth portion 212 is configured differently than the first portion 112. The fourth portion 212 is contiguous with the first portion 112. When the through-bolt 180 is tightened, the second cylinder block 210 is maintained in compression.

The through-bolt aperture 102 also includes a fifth portion 222 that is defined through the second head 220 and may be configured in the same way as the second portion 122. In other embodiments, however, the fifth portion 222 is configured differently than the second portion 122. When the through-bolt 180 is tightened, the second head 220 is maintained in compression.

The through-bolt aperture 102 also includes a sixth portion 232 that is defined through the second overhead structure 230 and may be configured in the same way as the third portion 132. In other embodiments, however, the sixth portion 232 is configured differently than the third portion 132. In some embodiments, the sixth portion 232 is positioned in the second base portion 240. In some embodiments, the sixth portion 232 is threaded and configured to engage corresponding threads on the through-bolt 180. In other embodiments, both the third portion 132 and the sixth portion 232 is threaded and configured to engage corresponding threads on the through-bolt 180. Thus, a portion (e.g., the sixth portion 232, the sixth portion 232 and the third portion 132) of the through-bolt aperture 102 is threaded and threadably engaged with corresponding threads of the through-bolt 180.

In various embodiments, the internal combustion engine 100 includes two of the through-bolts 180 (e.g., a first through-bolt 180 and a second through-bolt 180), and two of the through-bolt apertures 102 (e.g., a first through-bolt aperture 102 and a second through-bolt aperture 102). The first through-bolt aperture 102 and the second through-bolt aperture 102 are each defined through the first overhead structure 130, the first head 120, the first cylinder block 110, the second cylinder block 210, the second head 220, and the second overhead structure 230. The first through-bolt 180 extends through the first through-bolt aperture 102 and couples the first overhead structure 130, the first head 120, the first cylinder block 110, the second cylinder block 210, the second head 220, and the second overhead structure 230. The second through-bolt 180 extends through the second through-bolt aperture 102 and couples the first overhead structure 130, the first head 120, the first cylinder block 110, the second cylinder block 210, the second head 220, and the second overhead structure 230.

In some embodiments, the internal combustion engine 100 also includes a third through-bolt 180 and a third through-bolt aperture 102. The third through-bolt aperture 102 is defined through the first overhead structure 130, the first head 120, the first cylinder block 110, the second cylinder block 210, the second head 220, and the second overhead structure 230. The third through-bolt 180 extends through the first through-bolt aperture 102 and couples the first overhead structure 130, the first head 120, the first cylinder block 110, the second cylinder block 210, the second head 220, and the second overhead structure 230.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

References herein to the positions of elements (e.g., "top," "bottom," "above," "below," "left," "right") are merely used to describe the orientation of various elements in the FIGURES. It should be noted that the orientation of various elements may differ according to other exemplary embodiments, and that such variations are intended to be encompassed by the present disclosure.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. An internal combustion engine comprising:
   a first cylinder block;
   a first head in contact with the first cylinder block;
   a first overhead structure in contact with the first head opposite the first cylinder block;
   a second cylinder block in contact with the first cylinder block opposite the first head;
   a second head in contact with the second cylinder block opposite the first cylinder block;
   a second overhead structure in contact with the second head opposite the second cylinder block;
   a first through-bolt aperture defined through the first overhead structure, the first head, the first cylinder block, the second cylinder block, the second head, and the second overhead structure; and
   a first through-bolt extending through the first through-bolt aperture and coupling the first overhead structure, the first head, the first cylinder block, the second cylinder block, the second head, and the second overhead structure.

2. The internal combustion engine of claim 1, wherein at least one of:
   a portion of the first through-bolt aperture in the first overhead structure is threaded and threadably engaged with corresponding threads on the first through-bolt; or
   a portion of the first through-bolt aperture in the second overhead structure is threaded and threadably engaged with corresponding threads on the first through-bolt.

3. The internal combustion engine of claim 1, wherein at least one of the first overhead structure or the second overhead structure comprises a cam shaft aperture configured to receive and retain a cam shaft.

4. The internal combustion engine of claim 1, wherein:
   the first overhead structure comprises:
      a first cam shaft aperture configured to receive and retain a first cam shaft,
      a first base portion,
      a first support portion configured to support the first cam shaft, and
      a first neck portion coupling the first support portion to the first base portion and maintaining the first base portion spaced apart from the first support portion; and
   the first through-bolt aperture is positioned in the first base portion.

5. The internal combustion engine of claim 4, further comprising:
   a second through-bolt aperture defined through the first overhead structure, the first head, the first cylinder block, the second cylinder block, the second head, and the second overhead structure; and
   a second through-bolt extending through the second through-bolt aperture and coupling the first overhead structure, the first head, the first cylinder block, the second cylinder block, the second head, and the second overhead structure.

6. The internal combustion engine of claim 5, wherein:
   the second overhead structure comprises:
      a second cam shaft aperture configured to receive and retain a second cam shaft,
      a second base portion,
      a second support portion configured to support the second cam shaft, and
      a second neck portion coupling the second support portion to the second base portion and maintaining the second base portion spaced apart from the second support portion; and
   the second through-bolt aperture is positioned in the second base portion.

7. The internal combustion engine of claim 1, further comprising:
- a second through-bolt aperture defined through the first overhead structure, the first head, the first cylinder block, the second cylinder block, the second head, and the second overhead structure;
- a second through-bolt extending through the second through-bolt aperture and coupling the first overhead structure, the first head, the first cylinder block, the second cylinder block, the second head, and the second overhead structure;
- a third through-bolt aperture defined through the first overhead structure, the first head, the first cylinder block, the second cylinder block, the second head, and the second overhead structure; and
- a third through-bolt extending through the third through-bolt aperture and coupling the first overhead structure, the first head, the first cylinder block, the second cylinder block, the second head, and the second overhead structure.

8. The internal combustion engine of claim 7, wherein:
the first through-bolt aperture and the second through-bolt aperture are aligned on a first plane; and
the second through-bolt aperture and the third through-bolt aperture are aligned on a second plane that is orthogonal to the first plane.

9. The internal combustion engine of claim 8, wherein:
the first through-bolt aperture and the third through-bolt aperture are aligned on a third plane;
the first cylinder block comprises a first cylinder; and
the first through-bolt aperture and the third through-bolt aperture are configured such that the third plane extends through the first cylinder.

10. The internal combustion engine of claim 1, wherein:
the first cylinder block comprises:
- a first cylinder, and
- a second cylinder;

the second cylinder block comprises:
- a third cylinder that is aligned with the first cylinder, and
- a fourth cylinder that is aligned with the second cylinder; and the first through-bolt aperture is disposed adjacent the first cylinder, the second cylinder, the third cylinder, and the fourth cylinder.

11. The internal combustion engine of claim 10, wherein:
the first cylinder is centered on a first axis; and
the first through-bolt aperture is centered on a second axis that is parallel to the first axis.

12. The internal combustion engine of claim 1, wherein:
the first cylinder block is made from aluminum; and
the first head is made from aluminum.

13. The internal combustion engine of claim 12, wherein:
the second cylinder block is made from aluminum; and
the second head is made from aluminum.

14. The internal combustion engine of claim 12, wherein:
the first overhead structure is not made from aluminum; and
the second overhead structure is not made from aluminum.

15. The internal combustion engine of claim 1, wherein:
the first head is made from aluminum;
the second head is made from aluminum;
the first overhead structure is not made from aluminum; and
the second overhead structure is not made from aluminum.

16. An internal combustion engine comprising:
a first cylinder block;
a first head in contact with the first cylinder block;
a first overhead structure in contact with the first head opposite the first cylinder block;
a second cylinder block in contact with the first cylinder block opposite the first head;
a second head in contact with the second cylinder block opposite the first cylinder block;
a first through-bolt aperture defined through the first overhead structure, the first head, the first cylinder block, the second cylinder block, and the second head;
a first through-bolt extending through the first through-bolt aperture and coupling the first overhead structure, the first head, the first cylinder block, the second cylinder block, and the second head;
a second through-bolt aperture defined through the first overhead structure, the first head, the first cylinder block, the second cylinder block, and the second head; and
a second through-bolt extending through the second through-bolt aperture and coupling the first overhead structure, the first head, the first cylinder block, the second cylinder block, and the second head.

17. The internal combustion engine of claim 16, wherein:
the first head is made from aluminum; and
the first overhead structure is not made from aluminum.

18. The internal combustion engine of claim 16, wherein:
the first cylinder block comprises a first cylinder;
the second cylinder block comprises a second cylinder; and
the first cylinder block and the second cylinder block are configured such that the first cylinder is aligned with the second cylinder.

19. The internal combustion engine of claim 16, wherein:
a third through-bolt aperture defined through the first overhead structure, the first head, the first cylinder block, the second cylinder block, and the second head;
a third through-bolt extending through the third through-bolt aperture and coupling the first overhead structure, the first head, the first cylinder block, the second cylinder block, and the second head;
the first through-bolt aperture and the second through-bolt aperture are aligned on a first plane; and
the second through-bolt aperture and the third through-bolt aperture are aligned on a second plane that is orthogonal to the first plane.

20. The internal combustion engine of claim 19, wherein:
the first cylinder block comprises a first cylinder and a second cylinder;
the second cylinder block comprises a third cylinder and a fourth cylinder;
the first cylinder block and the second cylinder block are configured such that the first cylinder is aligned with the third cylinder;
the first cylinder block and the second cylinder block are configured such that the second cylinder is aligned with the fourth cylinder; and
the first cylinder block, the second cylinder block, the first through-bolt aperture, and the second through-bolt aperture are configured such that the first plane extends between the first cylinder and the second cylinder and between the third cylinder and the fourth cylinder.

* * * * *